(12) United States Patent
Saadat et al.

(10) Patent No.: US 9,680,371 B2
(45) Date of Patent: Jun. 13, 2017

(54) CHARGE PUMPS HAVING VARIABLE GAIN AND VARIABLE FREQUENCY

(71) Applicant: QUALCOMM Incorporated, San Diego, CA (US)

(72) Inventors: Seyed Mahmoudreza Saadat, La Jolla, CA (US); Chunlei Shi, San Diego, CA (US); Chenchang Zhan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 252 days.

(21) Appl. No.: 14/260,658

(22) Filed: Apr. 24, 2014

(65) Prior Publication Data

US 2015/0311784 A1 Oct. 29, 2015

(51) Int. Cl.
*G05F 1/10* (2006.01)
*G05F 3/02* (2006.01)
*H02M 3/07* (2006.01)
*H02M 1/00* (2006.01)

(52) U.S. Cl.
CPC ...... *H02M 3/07* (2013.01); *H02M 2001/0022* (2013.01); *H02M 2001/0087* (2013.01)

(58) Field of Classification Search
CPC ............. H02M 3/07; H02M 2003/072; H02M 2003/076; H02M 2003/078; H02M 2003/077; G11C 5/145; G11C 5/147
USPC .......................................... 327/530, 534–537
See application file for complete search history.

(56) References Cited

U.S. PATENT DOCUMENTS

| | | | |
|---|---|---|---|
| 5,483,486 A | 1/1996 | Javanifard et al. | |
| 5,532,653 A | 7/1996 | Adkins | |
| 5,808,506 A | 9/1998 | Tran | |
| 5,986,487 A | 11/1999 | Ridgers | |
| 6,504,349 B2 * | 1/2003 | Jaworski | H02M 3/07 307/110 |
| 7,394,298 B2 | 7/2008 | Hazucha et al. | |
| 7,427,888 B2 | 9/2008 | Zhang et al. | |
| 8,115,461 B2 | 2/2012 | Yoshio | |

(Continued)

FOREIGN PATENT DOCUMENTS

| | | |
|---|---|---|
| EP | 0836129 A1 | 4/1998 |
| EP | 1443650 A2 | 8/2004 |

(Continued)

OTHER PUBLICATIONS

International Search Report and Written Opinion—PCT/US2015/027384—ISA/EPO—Jun. 19, 2015.

(Continued)

*Primary Examiner* — Lincoln Donovan
*Assistant Examiner* — Diana J Cheng
(74) *Attorney, Agent, or Firm* — Haynes and Boone, LLP

(57) ABSTRACT

In one embodiment, a circuit comprises a charge pump. A gain control circuit is configured to detect an input voltage and generate a gain control signal to change a gain of the charge pump to maintain the output voltage of the charge pump in a voltage range. A voltage to frequency converter is configured to detect the input voltage and change a frequency of a frequency control signal applied to the charge pump based in the detected input voltage to maintain the frequency in a frequency range so that the output voltage of the charge pump is maintained in the voltage range.

18 Claims, 8 Drawing Sheets

(56) References Cited

U.S. PATENT DOCUMENTS

| | | |
|---|---|---|
| 8,212,400 B2 | 7/2012 | Wu et al. |
| 2005/0088394 A1 | 4/2005 | Chung et al. |
| 2007/0177412 A1 | 8/2007 | Sharp |
| 2010/0219881 A1 | 9/2010 | Chen et al. |
| 2013/0113446 A1 | 5/2013 | De Haas |
| 2013/0234785 A1 | 9/2013 | Dai et al. |
| 2013/0257176 A1 | 10/2013 | Crespi et al. |
| 2015/0311783 A1 | 10/2015 | Saadat et al. |

FOREIGN PATENT DOCUMENTS

| | | |
|---|---|---|
| WO | 9835433 A1 | 8/1998 |
| WO | 2006078244 A1 | 7/2006 |

OTHER PUBLICATIONS

Rajapandian S., et al., "Implicit DC-DC Downconversion Through Charge-Recycling", IEEE Journal of Solid-State Circuits, IEEE Service Center, Piscataway, NJ,USA, vol. 40, No. 4, Apr. 1, 2005 (Apr. 1, 2005), pp. 846-852, XP011130838, ISSN: 0018-9200, DOI: 10.1109/JSSC.2004.842861.

International Search Report and Written Opinion—PCT/US2015/027382—ISA/EPO—Jul. 7, 2015.

Alimadadi M., et al., "A Fully Integrated 660 MHz Low-Swing Energy-Recycling DC-DC Converter," IEEE Transactions on Power Electronics, Jun. 2009, vol. 24 (6), pp. 1475-1485.

Bayer E., et al., "Charge pump with Active Cycle regulation—closing the gap between linearand skip modes," IEEE 31st Annual Power Electronics Specialists Conference, 2000, vol. 3, pp. 1497-1502.

Mazumdar K., et al., "Exploration of Charge Recycling DC-DC Conversion Using a Switched Capacitor Regulator," Journal of Low Power Electronics and Applications, 2013, vol. 3 (3), pp. 250-266.

Rajapandian S., et al., "High-Voltage Power Delivery through Charge Recycling," IEEE Journal of Solid-State Circuits, Jun. 2006, vol. 41 (6), pp. 1400-1410.

Ueda K., et al., "Low-Power On-Chip Charge-Recycling DC-DC Conversion Circuit and System," IEEE Journal of Solid-State Circuits, Nov. 2013, vol. 48 (11), pp. 2608-2617.

Wen Y., et al., "Closed-loop control of gate-charge recycling in a 20 MHz dc-dc converter," 2010 IEEE 12th Workshop on Control and Modeling for Power Electronics (COMPEL), Jun. 2010, pp. 1-7.

\* cited by examiner

US 9,680,371 B2

CHARGE PUMPS HAVING VARIABLE GAIN AND VARIABLE FREQUENCY

RELATED APPLICATIONS

This application is related to U.S. patent application Ser. No. 14/260,592, filed on Apr. 24, 2014, entitled "CHARGE-RECYCLING CIRCUITS" and issued as U.S. Pat. No. 9,525,337 on Dec. 20, 3016 and U.S. patent application Ser. No. 14/260,733, filed on Apr. 24, 2014, entitled "CHARGE-RECYCLING CIRCUITS INCLUDING SWITCHING POWER STAGES WITH FLOATING RAILS" and issued as U.S. Pat. No. 9,276,562 On Mar. 1, 2016, both of which are incorporated by reference herein in their entirety.

BACKGROUND

The disclosure relates to charge pumps, and in particular, to charge pumps having variable gain and variable frequency.

Unless otherwise indicated herein, the approaches described in this section are not admitted to be prior art by inclusion in this section.

Charge pumps are often used to regulate voltages in electronic systems. Variations in the input voltage to the charge pump affect the efficiency of the charge pump and the systems driven by the charge pump. Various feedback systems of charge pumps have been proposed for detecting the output of the charge pump and controlling the charge pump.

SUMMARY

The present disclosure relates to charge pumps having variable gain and variable frequency.

In one embodiment, the present disclosure includes a circuit comprises a charge pump. A gain control circuit is configured to detect an input voltage and generate a gain control signal to change a gain of the charge pump to maintain the output voltage of the charge pump in a voltage range. A voltage to frequency converter is configured to detect the input voltage and change a frequency of a frequency control signal applied to the charge pump based in the detected input voltage to maintain the frequency in a frequency range so that the output voltage of the charge pump is maintained in the voltage range.

In one embodiment, the charge pump includes a plurality of capacitors that couple charge between an input of the charge pump and an output of the charge pump. The gain control signal configures the number of capacitors that couple the charge. The gain control circuit is further configured to change the gain of the charge pump by reducing a number of capacitors that couple charge based on an increase of the frequency of the control signal.

In one embodiment, the gain control circuit is further configured to change the gain of the charge pump by changing a number of capacitors of the charge pump that couple charge between an input of the charge pump and an output of the charge pump.

In one embodiment, the gain control circuit is an analog-to-digital converter that is configured to generate a digital signal to control selection of switches in the charge pump for controlling selection of capacitors in the charge pump based on the input voltage.

In one embodiment, the voltage to frequency converter is a voltage controlled oscillator configured to generate clock signals as the frequency control signal in response to the changes in the detected input voltage.

In one embodiment, the circuit further comprises a current detector configured to detect input current into the charge pump. The voltage to frequency converter is further configured to change the frequency of the control signal based on the detected input current.

In one embodiment, the circuit further comprises a current source coupled to an input of the charge pump, a current sink coupled between the current source and ground, and a current detector configured to detect current from the current source. The voltage to frequency converter is further configured to change the frequency of the control signal based on the detected input current to cause input current to the charge pump to be approximately equal to the current from the current source.

In one embodiment, the present disclosure includes a circuit comprising a charge pump including an input for receiving an input voltage and having an output for providing an output voltage based on the input voltage. The charge pump has a selectable gain in response to a gain control signal and a gain in response to a frequency control signal. A gain control circuit is configured to detect the input voltage and generate the gain control signal to select the gain of the charge pump to maintain the output voltage of the charge pump in a voltage range. A frequency control circuit is configured to detect the input voltage and generate the frequency control signal to maintain the frequency in a frequency range so that the output voltage of the charge pump is maintained in the voltage range.

In one embodiment, the present disclosure includes a method comprising detecting an input voltage to control a gain, a frequency, and an output voltage of a charge pump, changing the gain of the charge pump to maintain the output voltage of the charge pump in a voltage range, and changing a frequency of a control signal applied to the charge pump based on the detected input voltage to maintain the frequency in a frequency range so that the output voltage of the charge pump is maintained in the voltage range.

In one embodiment, changing the gain of the charge pump includes reducing a number of capacitors that couple charge between an input of the charge pump and an output of the charge pump based on an increase of the frequency of the control signal.

In one embodiment, changing the gain of the charge pump includes changing a number of capacitors that couple charge between an input of the charge pump and an output of the charge pump.

In one embodiment, the method further comprises detecting input current into the charge pump, and changing the frequency of the control signal based on the detected input current.

In one embodiment, the method further comprises sourcing a current to an input of the charge pump, sinking a current sink from the current source to ground, detecting current from the current source, and changing the frequency of the control signal based on the detected input current to cause input current to the charge pump to be approximately equal to the current from the current source.

The following detailed description and accompanying drawings provide a better understanding of the nature and advantages of the present disclosure.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, make apparent to those of skill in the art how embodiments in accordance with the present disclosure may be practiced. In the accompanying drawings.

DETAILED DESCRIPTION

In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples, alone or in combination with other features described below, and may further include modifications and equivalents of the features and concepts described herein.

Figure 1:
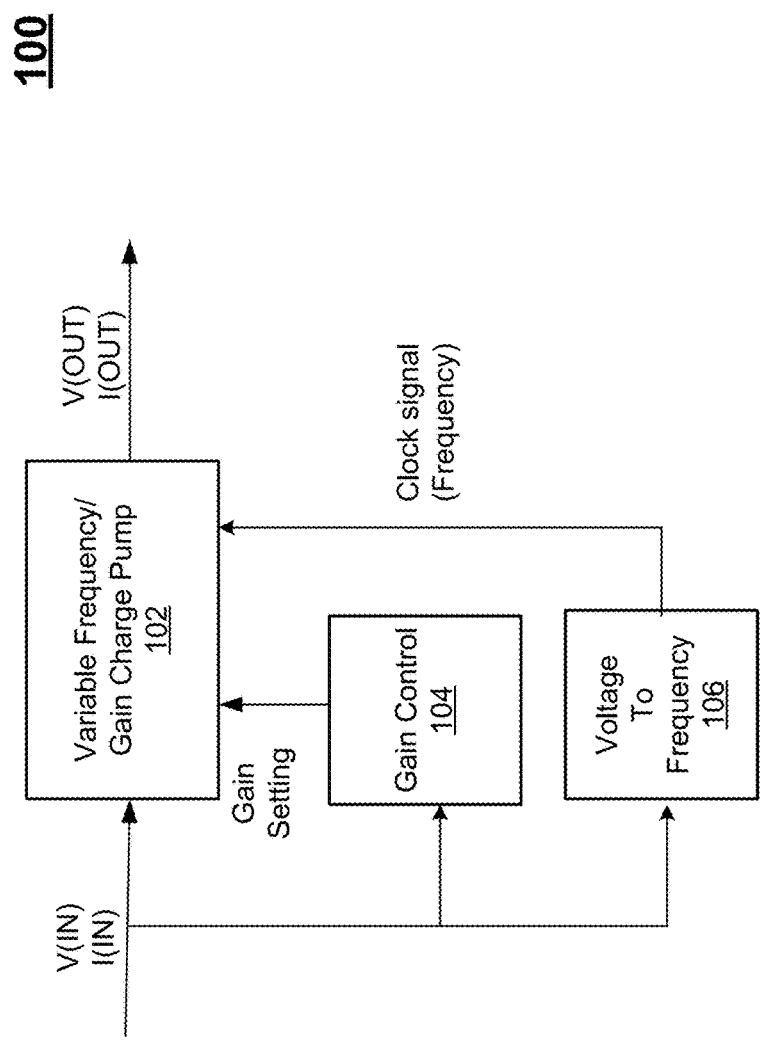
FIG. 1 illustrates a block diagram of a charge pump system according to an embodiment.

FIG. 1 illustrates a block diagram of a charge pump system 100 according to an embodiment. Charge pump system 100 comprises a variable frequency/variable gain charge pump 102, a gain control circuit 104, and a voltage to frequency converter 106.

Charge pump system 100 can operate as a voltage regulator or a current regulator or both. In some embodiments, charge pump system 100 provides an output voltage V(OUT) from an input voltage V(IN). Charge pump system 100 operates as a feed-forward control system. Charge pump 102 maintains the output voltage V(OUT) in a first range while the input voltage V(IN) varies over a second range (e.g., due to ripple). The first range can be narrow so that the output voltage V(OUT) is substantially constant. The input voltage V(IN) also is provided as an input to voltage to frequency converter 106 (e.g., a voltage controlled oscillator). As the input voltage V(IN) varies from a low value to a high value (i.e., as the input voltage V(IN) increases), the frequency of a clock signal from voltage to frequency converter 106 also increases. An increase in frequency causes a corresponding increase in gain of charge pump 102, which tends to cause the output voltage V(OUT) to vary from a nominal value. However, the increased gain of charge pump 102 due to the increased frequency/input voltage V(IN) can be offset by selectively reducing the gain of charge pump 102 using gain control circuit 104 that also receives the input voltage V(IN). For example, gain may be reduced by reducing the number of capacitors that are operable in charge pump 102.

Accordingly, as the input voltage V(IN) varies from a low value to a high value, the output voltage V(out) may be maintained within a constrained range by reducing the number of capacitors in charge pump 103 to offset the increase in the input voltage V(IN) and increase in gain caused by an increase in the input voltage V(IN).

Because charge pump system 100 operates as a feed-forward system, the input voltage V(IN) should be in a range that keeps the frequency of voltage to frequency converter 106 in a range that limits the range of the output voltage V(OUT).

Figure 2:
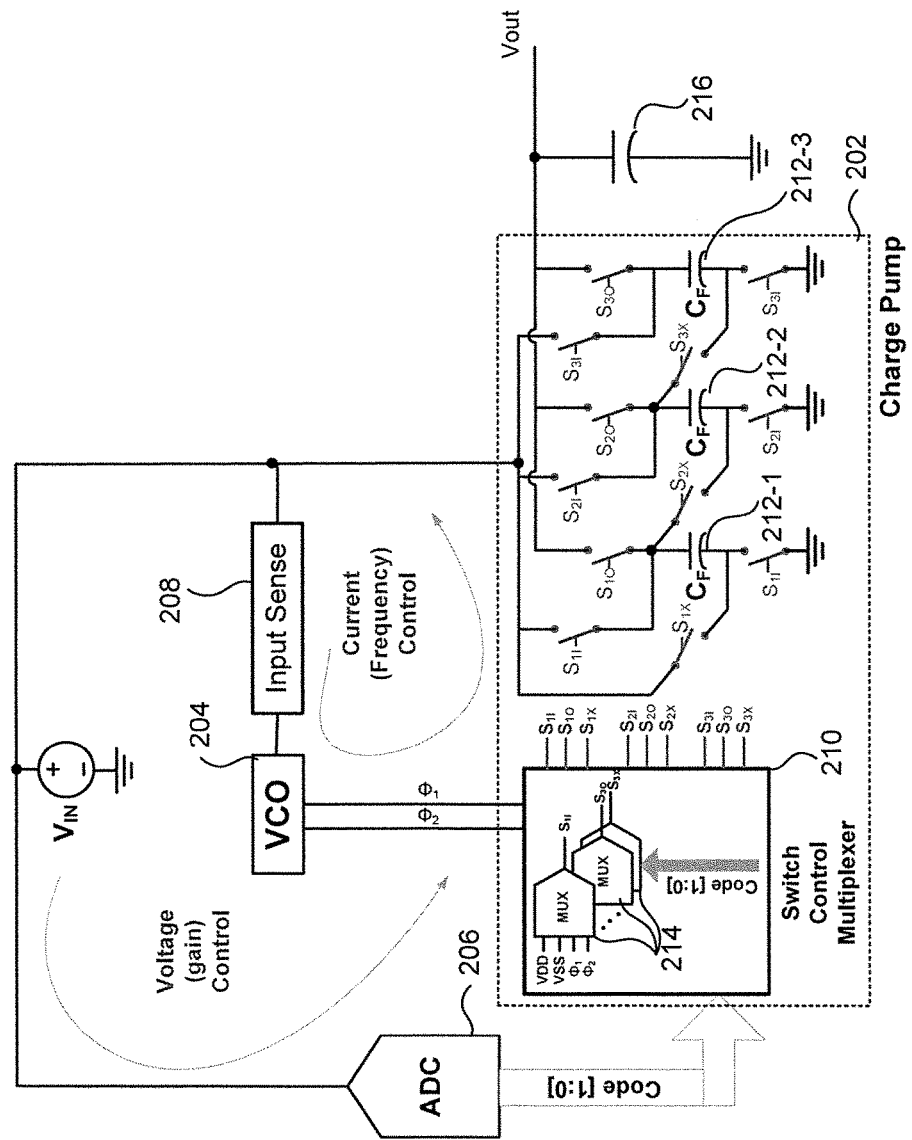
FIG. 2 illustrates a block diagram of a charge pump system according to a second embodiment.

FIG. 2 illustrates a block diagram of a charge pump system 200 according to an embodiment. Charge pump system 200 is an example implementation of the system 100. Charge pump system 200 comprises a charge pump 202, a voltage controlled oscillator (VCO) 204, a level sense circuit 206, and an input sense circuit 208. Charge pump 202 comprises a switch control multiplexer 210, a plurality of capacitors 212, and a plurality of switches S1I, S2I, S3I, S1G, S2G, S3G, S1O, S2O, S3O, S1X, S2X, and S3X.

Charge pump system 200 operates as a feed-forward control system. An input voltage Vin is received by charge pump 202 and boosted to an output voltage Vout. In some embodiments, it is desirable to maintain output voltage Vout approximately constant across variations of the input voltage Vin.

Input sense circuit 208 receives the input voltage Vin, and in accordance therewith, provides a voltage corresponding to the input voltage Vin to VCO 204. VCO 204 produces non-overlapping clocks—Φ1 and Φ2. The clocks Φ1 and Φ2 are provided to switch control multiplexer 210, which produces signals for turning the charge pump switches on and off. This is the frequency control of charge pump 202. Initially, during the clock Φ1, the Sx1 switches and SxG switches are closed so that the input voltage Vin charges each of three capacitors 212. Capacitor 212 has a capacitance Cf. During the clock Φ2, the clock Φ1 switches are open and the Sxx and Sx0 switches are closed so that the charge on the capacitors 212 is boosted to the output voltage Vout. In some embodiments, the output voltage Vout node includes a DC Capacitor 216 to maintain the output voltage Vout approximately constant. Because charge pump system 200 operates as a feed-forward system, the input voltage V(IN) should be in a range that keeps the frequency of VCO 204 in a range that limits the range of the output voltage V(OUT).

However, variations in the input voltage Vin may cause the input voltage Vin to increase from some low voltage to a high voltage. At a low end of the voltage variation of the input voltage Vin, the input voltage Vin may require more gain to achieve the desired level of the output voltage Vout. Thus, higher gain should be used. Conversely, at a high end of the voltage variation of the input voltage Vin, the input voltage Vin may need less gain so that the output voltage Vout does not become too large. This is the voltage or gain control of charge pump 202.

Accordingly, level sense circuit 206 (e.g., a comparator or an analog-to-digital convertor (ADC)) translates the input voltage Vin into a CODE that may be used to set the gain of charge pump 202. In this example, the CODE includes two bits for four gain settings and is designated as CODE[1:0]. For example, when the input voltage Vin is low (below a first voltage), ADC 206 may generate CODE corresponding to a maximum gain (in this example, a gain of four). Maximum gain may use all three capacitors 212, for example. When the input voltage Vin increases above the first voltage but is still below a second voltage, the input voltage Vin is translated to a CODE that corresponds to an intermediate gain where one of the capacitors 212 is disabled (in this example, a gain of three). When the input voltage Vin is high (above the second voltage), ADC 206 may translate the input voltage Vin to a CODE corresponding to a minimum gain (in this example, a gain of two), where two capacitors 212 are disabled.

The CODE is received by switch control multiplexer 210 that selectively causes certain switches to disable one or more of the capacitors 212. Switch control multiplexer 210 comprises a plurality of multiplexers 214 to generate control or switching signals for the plurality of switches S1I, S2I and S3I S1G, S2G, S3G, S1O, S2O, S3O, S1X, S2X, and S3X. As the CODE changes, switching signals are placed in states to disable one or more capacitors 212.

Accordingly, the output voltage Vout may be maintained approximately constant by disabling capacitors 212 in charge pump 202 to reduce the gain of the charge pump 202 as the input voltage Vin increases.

Switch control multiplexer 210 generates control signals to switch charge pump 202 for controlling the gain of charge pump 202 in response to the input voltage Vin.

Switches S1I, S2I and S3I selectively couple capacitors 212-1 through 212-3, respectively, to the input voltage Vin to transfer charge to the capacitors 212 in response to corresponding control signals from switch control multiplexer 210.

Switches S1G, S2G and S3G selectively couple capacitors 212-1 through 212-3, respectively, to ground in response to corresponding control signals from switch control multiplexer 210.

Switches S1O, S2O and S3O selectively couple capacitors 212-1 through 212-3, respectively, to the output voltage Vout to transfer charge from the capacitors 212 to the output voltage Vout in response to corresponding control signals from switch control multiplexer 210.

Switches S1X, S2X and S3X selectively couple selected capacitors 212-1 through 212-3 in series and to the input voltage Vin to boost the voltage and set the gain of the charge pump in response to corresponding control signals from switch control multiplexer 210. Three capacitors 212 are shown in FIG. 2, but other numbers can be used to provide other values of gain of charge pump 202.

Figure 3:
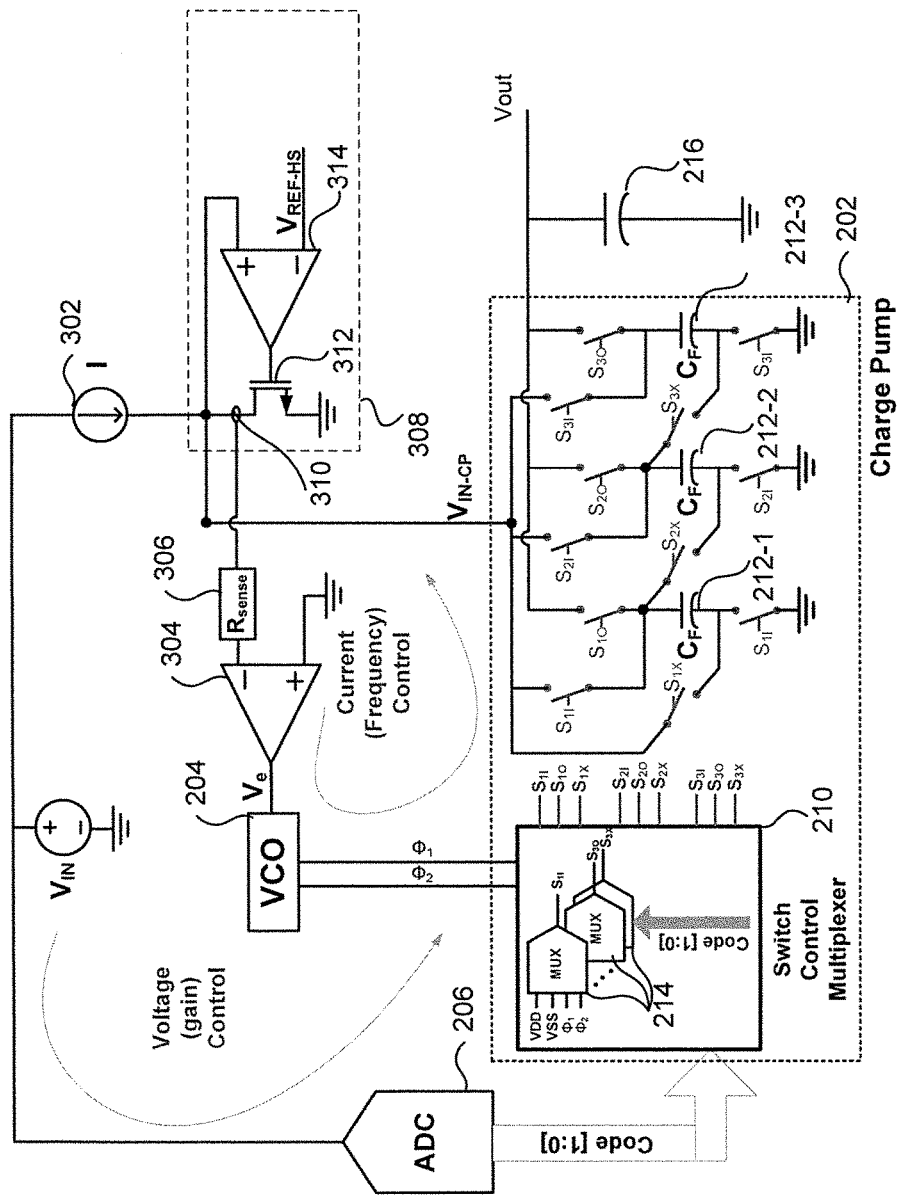
FIG. 3 illustrates a block diagram of a charge pump system according to a third embodiment.

FIG. 3 illustrates a block diagram of a charge pump system 300 according to an embodiment. Charge pump system 300 is an example implementation of the system 100. Charge pump system 300 operates as a feed-forward control system. Charge pump system 300 comprises charge pump 202, VCO 204, ADC 206, DC Capacitor 216, a current source 302, a comparator 304, a sense resistor 306, a sense circuit 310, and a voltage regulator 308. Voltage regulator 308 can be a low-dropout (LDO) regulator. Voltage regulator 308 comprises an NMOS transistor 308 and a comparator 314. Sense resistor 306 and sense circuit 310 represent, for example, a series sense resistor or a parallel FET current sense circuit. Sense resistor 306 and sense circuit 310 sense the current from current source 302 and provide a voltage to a negative terminal of comparator 304. The positive terminal of comparator 304 is coupled to a reference voltage, which in this example, is grounded. Comparator 304 provides an error voltage Ve to VCO 204, which generates the clock signals Φ1 and Φ2 in similar manner as described above. Charge pump system 300 controls the current into charge pump 202 and NMOS transistor 308 by changing the frequency of VCO 204 to change the switching frequency of charge pump 202. As the switching frequency of charge pump 202 increases, charge pump 202 transfers more charge from current source 302 and accordingly from the input of the charge pump 202, to the output of the charge pump 202, and thereby reducing the current into NMOS transistor 308. In one embodiment, comparator 304 controls VCO 204 to control the switching frequency so that the current into NMOS transistor 308 is zero or substantially zero, so that all or substantially all current from current source 302 is provided to charge pump 202.

In the charge pump system 300, the input voltage Vin into ADC 206 can be related to the input voltage VIN-CP into charge pump 202 as described below.

Figure 4:
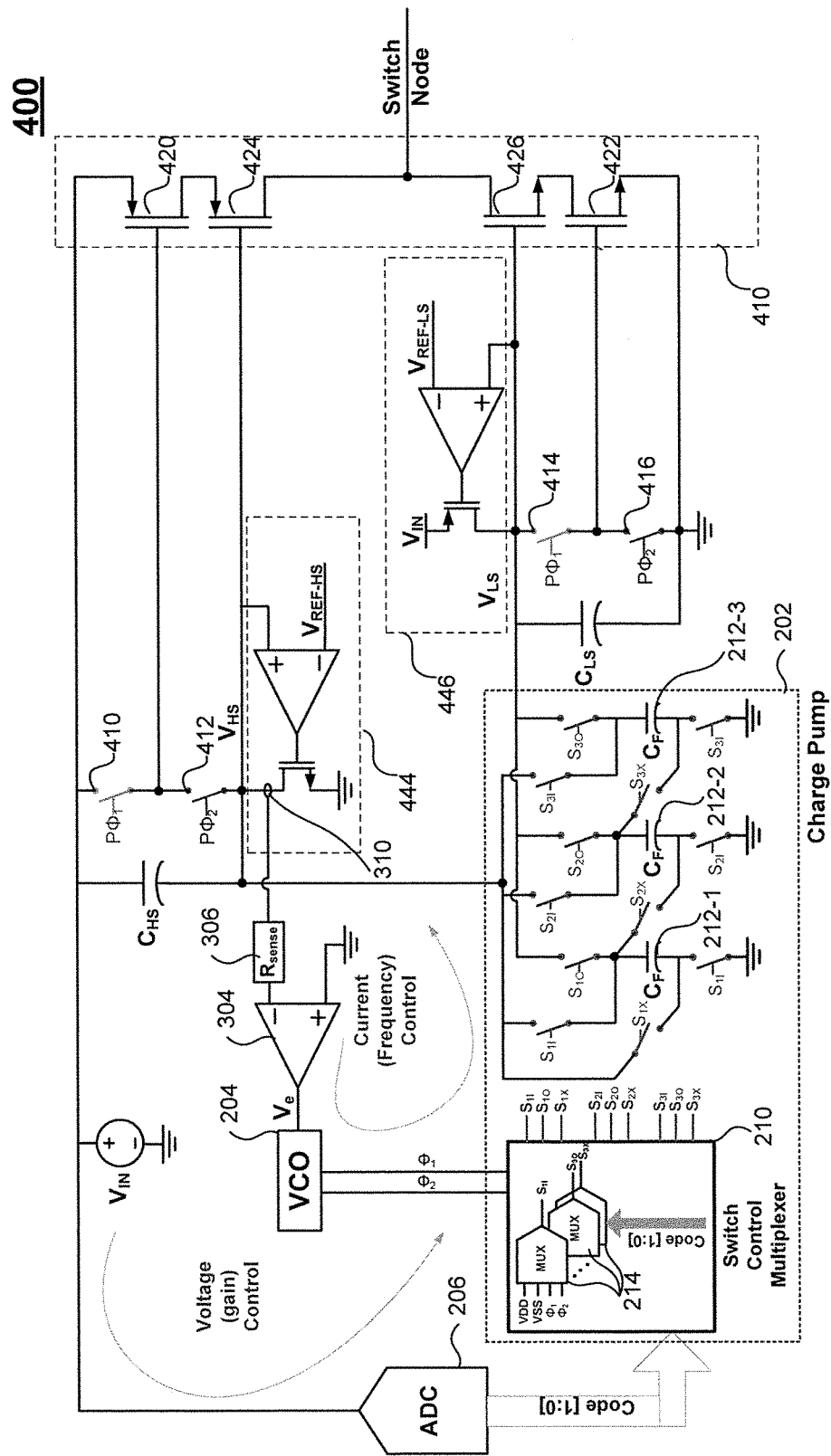
FIG. 4 illustrates a block diagram of a charge pump system according to a fourth embodiment.

FIG. 4 illustrates a block diagram of a charge pump system 400 according to an embodiment. Charge pump system 400 is an example implementation of the system 100. Charge pump system 400 operates as a feed-forward control system. Charge pump system 400 comprises charge pump 202, VCO 204, ADC 206, a comparator 304, a sense resistor 306, a sense circuit 310, a switching driver 410, a high side mid-voltage source 444, and a low side mid-voltage source 446. Charge pump system 400 is an example implementation of charge pump 202 with switching driver 410, which can be, for example, a switching driver for a buck converter.

Switching driver 410 comprises a high side switching power transistor 420, a low side switching power transistor 422, a high side cascode transistor 424, and a low side cascode transistor 426. Cascode transistors 424 and 426 are high side and low side cascode transistors, respectively, to reduce voltage drop across switching power transistors 420 and 422, respectively. High side mid-voltage source 444 and low side mid-voltage source 446 provide a high side mid-voltage (VHS) and a low side mid-voltage (VLS), respectively, as approximately constant gate drive voltages to cascode transistor 424 and cascode transistor 426, respectively. In this example, the low side mid-voltage (VLS) is greater than the high side mid-voltage (VHS). In one embodiment, high side mid-voltage source 444 and low side mid-voltage source 446 can be low-dropout (LDO) regulators. Additionally, high side mid-voltage source 444 can be used as the low supply voltage for a high side driver that produces switching signals to high side switching power transistor 420. Accordingly, the high side driver is a load on high side mid-voltage source 444.

A similar arrangement is used for the low side. Low side mid-voltage source 446 can be used as the low supply voltage for a low side driver that produces switching signals to low side switching power transistor 422. Accordingly, the low side driver is a load on low side mid-voltage source 446.

Charge pump system 400 further comprises a plurality of switches 410, 412, 414, and 416.

An external controller (not shown) generates a clock PΦ1 and a clock PΦ2 that, in this example, are non-overlapping clocks for control signals for switches 410, 412, 414, and 416.

LDO 444 generates the high side mid-voltage (VHS) in response to a high side reference voltage (VREF-HS). LDO 446 generates a low side mid-voltage (VLS) in response to a low side reference voltage (VREF-LS). The outputs (the voltages VHS and VLS) of LDO 444 and LDO 446 are coupled together through charge pump 202. In this example, charge pump 202 receives a high side mid-voltage (VHS) (between about 0.4-0.8 V) and outputs charge to the low side mid-voltage (VLS) to maintain the low side mid-voltage (VLS) at close to 1.2 V. In this example, the input voltage Vin equals the power supply Vdd may vary from 1.6-2 V, and charge pump 202 is configured to produce different gain based on the value of power supply Vdd to maintain low side mid-voltage (VLS) at close to 1.2 V.

Switches 410 and 412 coupled between the input voltage Vin and the high side mid-voltage (VHS) are switches in the high side driver. Switches 414 and 416 coupled between the low side mid-voltage VLS and ground are switches in the low side driver.

On the high side driver, switch 410 selectively couples the gate of high side switching power transistor 420 and switch 412 to the input voltage Vin in response to a first control signal (e.g., being in an active state or on state). Switch 412 selectively couples the gate of high side switching power transistor 420 to the output of LDO 444 in response to a second control signal (e.g., being in an active state or on state).

On the low side driver, switch 416 selectively couples the gate of low side switching power transistor 422 to ground in response to the second control signal (e.g., being in an active state or on state). Switch 414 selectively couples the gate of low side switching power transistor 422 to the output of LDO 444 in response to a first control signal (e.g., being in an active state or on state).

Switch 410 and switch 414 are controlled by a first control signal (clock PΦ1). Switch 412 and switch 416 are controlled by a second control signal (clock PΦ2). Switches 410 and 414 open before switches 412 and 416 close, and similarly switches 412 and 416 open before switch 410 and switch 414 close ("break before make"). During clock PΦ1 the low side is on. Clock PΦ1 closes switch 410 to pull the gate of high side switching power transistor 420 to the input voltage Vin to turn off high side switching power transistor 420 and pulls the gate of low side switching power transistor 422 to the low side mid-voltage (VLS) to turn on low side switching power transistor 422. During clock PΦ2, the high side is on. Clock PΦ2 closes switch 412 to pull the gate of high side switching power transistor 420 to the high side mid-voltage (VHS) to turn on high side switching power transistor 420 and closes switch 416 to pull the gate of low side switching power transistor 422 to ground to turn off low side switching power transistor 422.

Figure 5:
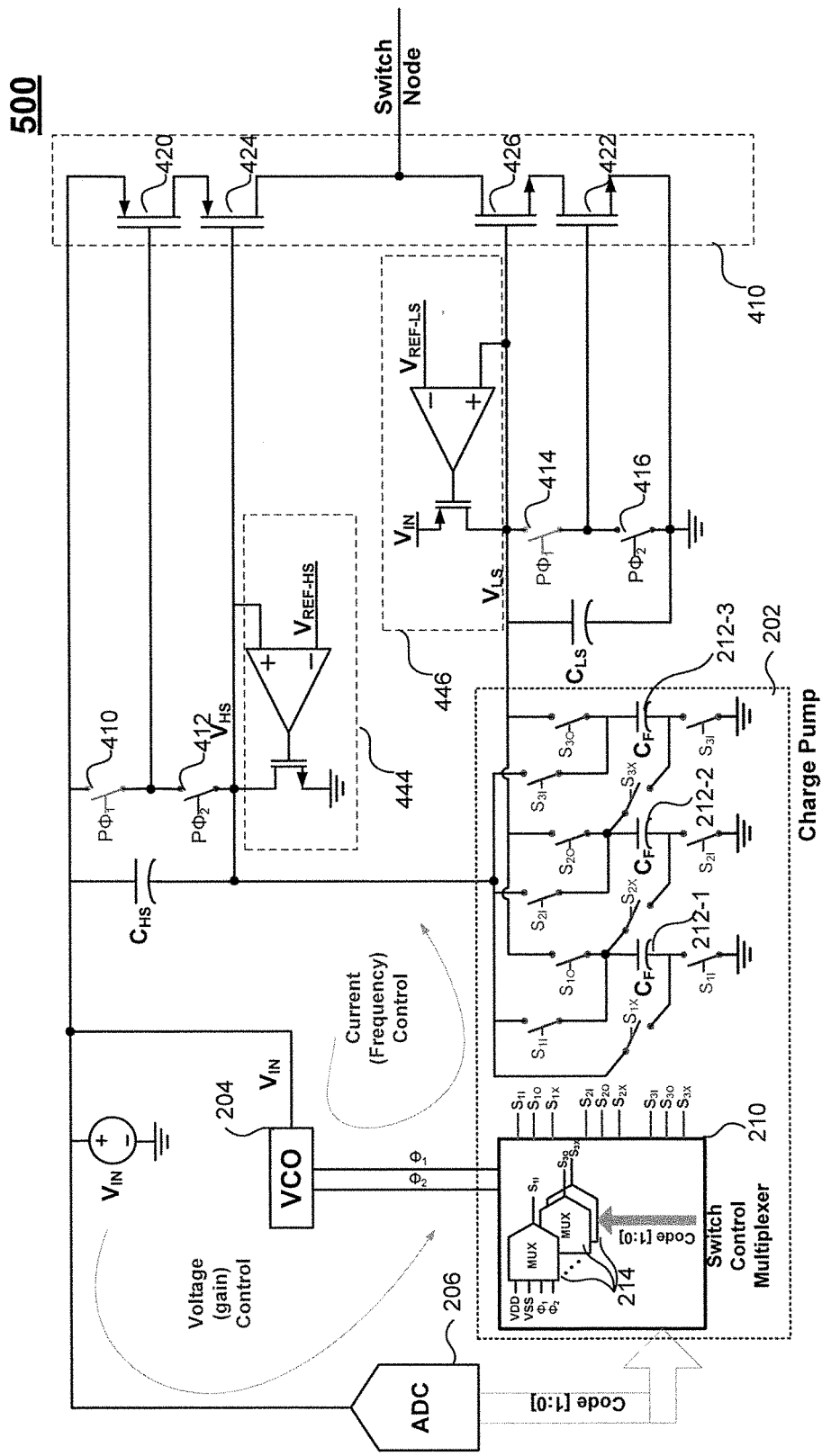
FIG. 5 illustrates a block diagram of a voltage controlled oscillator according to a fifth embodiment.

FIG. 5 illustrates a block diagram of a charge pump system 500 according to an embodiment. Charge pump system 500 is an example implementation of the system 100. Charge pump system 500 operates as a feed-forward control system. Charge pump system 500 comprises charge pump 202, VCO 204, ADC 206, a comparator 304, a sense resistor 306, a sense circuit 310, a switching driver 410, a high side mid-voltage source 444, a low side mid-voltage source 446, and a plurality of switches 410, 412, 414, and 416. Charge pump system 500 is similar to charge pump system 400, but does not sense input current into charge pump 202. The input voltage VIN into ADC 206 is the same input voltage VIN into charge pump 202. Charge pump system 500 controls the gain and frequency of the charge pump 202 based on the input voltage VIN, and not based on input current into the charge pump 202.

Figure 6:
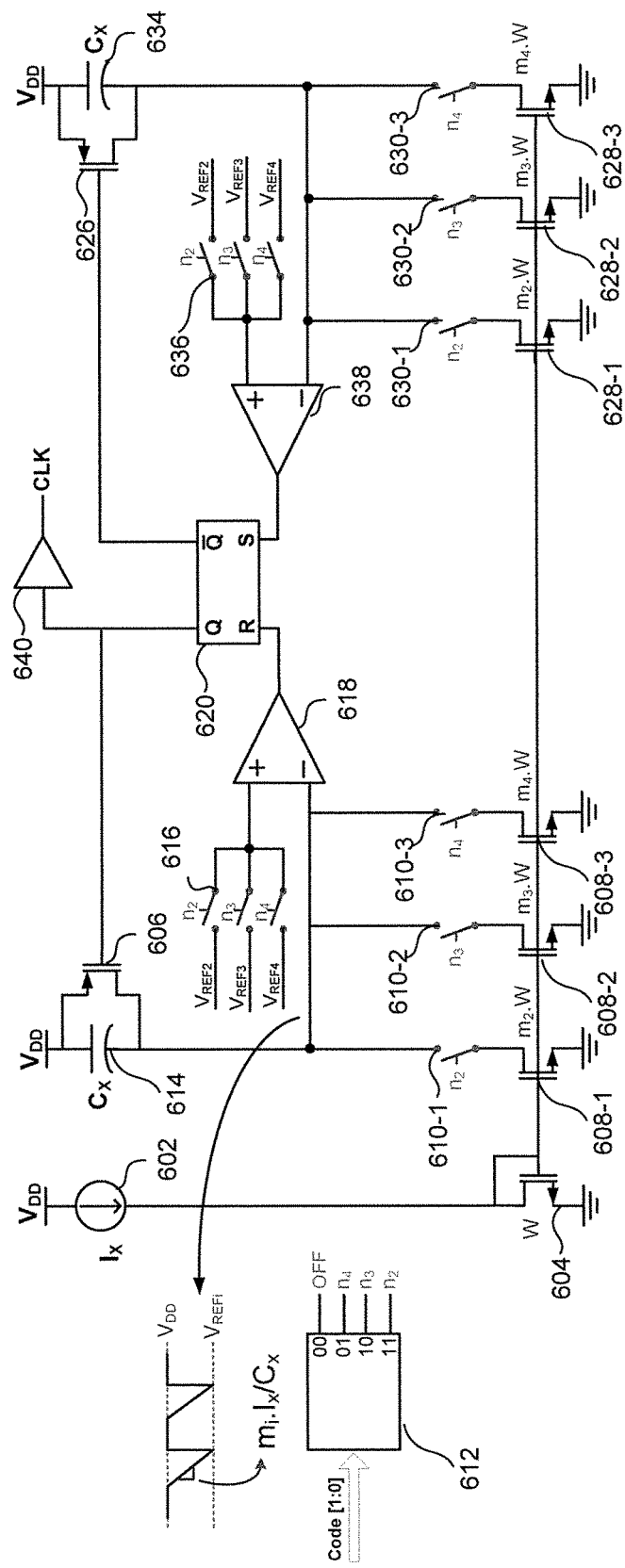
FIG. 6 illustrates a block diagram of a voltage controlled oscillator according to an embodiment.

FIG. 6 illustrates a block diagram of voltage controlled oscillator 204 according to an embodiment. VCO 204 comprises a current source 602, an NMOS transistor 604, a PMOS transistor 606, and a plurality of NMOS transistors 608 arranged as a current mirror. The NMOS transistors 608-1 through 608-3 are selectively coupled in the current mirror by a plurality of switches 610-1 through 610-3, respectively. A multiplexer 612 generate a control signal representative of the gain settings (e.g., n2, n3 or n4) to control the switches 610 in response the CODE [1:0]. In this example, three transistors 608 and three switches 610 are shown to match the number of different non-zero gain settings n, which is three. A capacitor 614 is coupled across transistor 606 and has a capacitance Cx.

A switch circuit 616 provides a selected reference voltage to an input of a comparator 618 in response to the control signal representative of the gain settings from the multiplexer 612. In this example, the selected reference voltage can be a reference voltage Vref2, a reference voltage Vref3, and a reference voltage Vref4 corresponding to a gain n2, n3 and n4, respectively, Comparator 618 compares the voltage on the capacitor 614 to the selected reference voltage Vref and generates a signal to reset a set-reset (SR) latch 620.

VCO 204 further comprises a PMOS transistor 626, and a plurality of NMOS transistors 628 arranged as a current mirror with current source 602 and NMOS transistor 604. The NMOS transistors 628-1 through 628-3 are selectively coupled in the current mirror by a plurality of switches 630-1 through 630-3, respectively, in a similar manner as respective switches 610-1 through 630-3 in response to the control signal representative of the gain settings from multiplexer 612. A capacitor 634 is coupled across transistor 626 and has a capacitance Cx.

A switch circuit 636 provides a selected reference voltage to an input of a comparator 638 in response to the control signal representative of the gain settings from the multiplexer 612. In this example, the selected reference voltage can be a reference voltage Vref2, a reference voltage Vref23, and a reference voltage Vref4 corresponding to a gain n2, n3 and n4, respectively, Comparator 638 compares the voltage on the capacitor 634 to the selected reference voltage Vref and generates a signal to set SR latch 620. The Q output of SR latch 620 is provided to the gate of PMOS transistor 606 and to the input of an inverter 640, which generates a clock (CLK), which is used to generate the clock signals Φ1 and Φ2. The Q bar output of SR latch 620 is provided to the gate of PMOS transistor 626. The Q output and Q bar output of SR latch 620 turn on and off PMOS transistors 606 and 626, respectively, to set and reset SR latch 620 to generate the clock (CLK).

The frequency FCLK of the clock (CLK) is determined by:

$$F_{CLK} = \frac{m}{2} \frac{1_X}{C_X \times (V_{DD} - V_{REF})}$$

where m is determined from the gain n as follows:

$$m = \frac{n-1}{n^2}$$

The current Ix from current source 602 is set to be:

$$\frac{I_X}{C_X} = \frac{I_{CP-HS}}{C_F}$$

Where the current ICP-HS is the high side current from LDO 444 for the embodiments of FIGS. 4 and 5, or the current into the charge pump for other embodiments can be used. The reference voltage VREF is determined from:

$$V_{REF} = \frac{n+1}{n} \times V_{MID}$$

where the voltage VMID is the low side voltage VLS for the embodiments of FIGS. 4 and 5 or the output voltage Vout for the embodiments of FIGS. 2 and 3.

Figure 7:
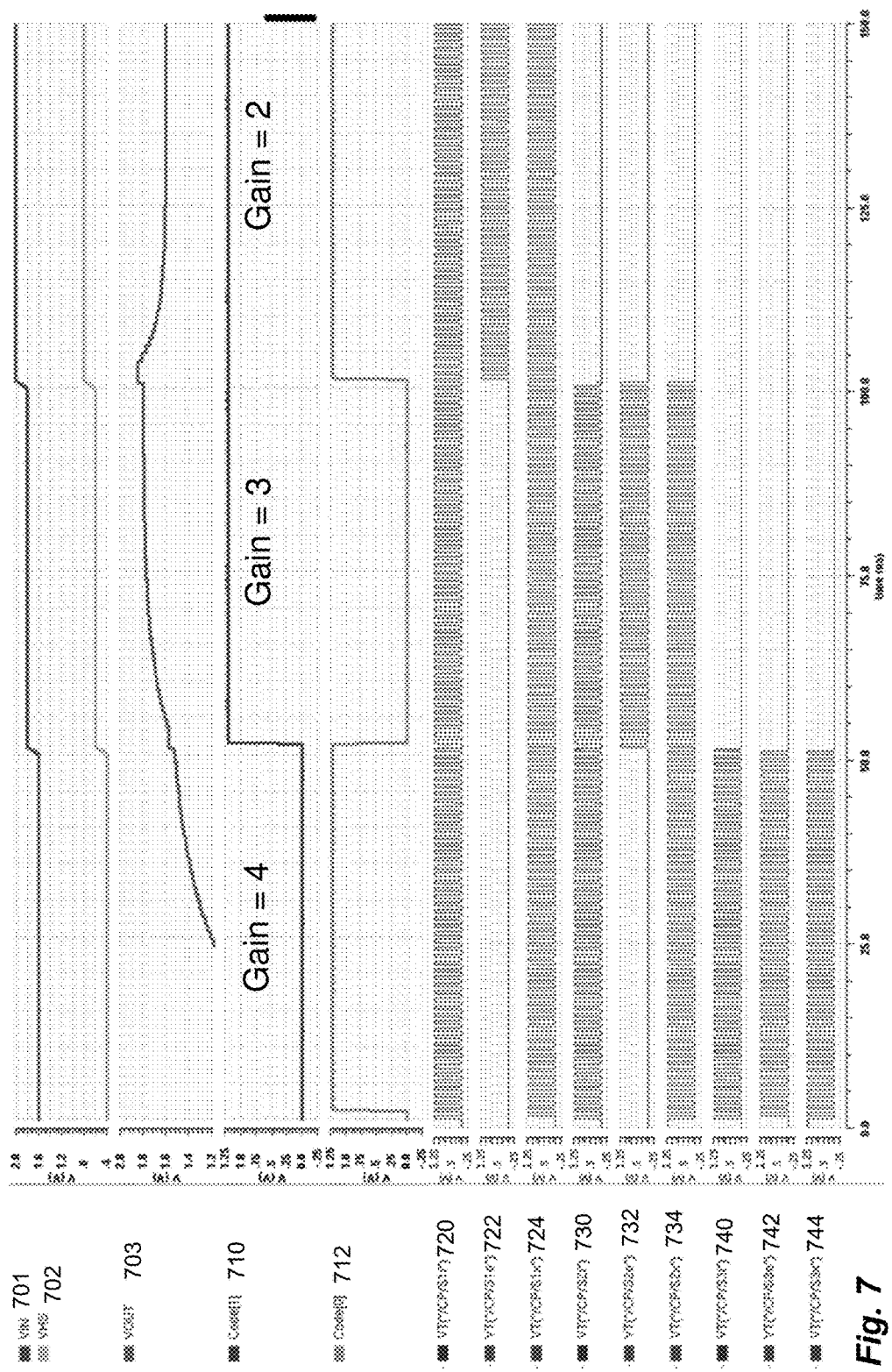
FIG. 7 illustrates a simplified timing diagram of a charge pump system according to an embodiment.

FIG. 7 illustrates a simplified timing diagram of the charge pump system 400 according to an embodiment. A line 701 represents the input voltage VIN that in this example increments from 1.6 V to 1.8 V to 2.0 V. A line 702 represents the high side voltage VHS that increments from 0.4 V to 0.6 V to 0.8 V. A line 703 represents the output voltage VOUT that rises from 1.2 V (the low side voltage VLS), peaks at 1.8 V, and levels at 1.6 V.

Lines 710 and 712 represent CODE[1] and CODE[0], respectively, and are shown in FIG. 7 as being set for a gain of 4 (also described above as n4), a gain of 3 (also described above as n3) and a gain of 2 (also described above as n2). As shown in FIG. 7, the gain is decreased as the input voltage Vin increases as shown by line 701, and the output voltage Vout as shown by line 703 stays in a narrow range after the initial increase.

Lines 720, 722 and 724 represent timing signals of switches S1I, S1O and S1X, respectively. In this example, the signals for switches S1I and S1X are on and the signal for switch S1O is only on for a gain of two.

Lines 730, 732 and 734 represent timing signals of switches S2I, S2O and S2X, respectively. In this example, the signals for switches S1I and S1X are on for a gain of three and four, and the signal for switch S2O is only on for a gain of three.

Lines 740, 742 and 744 represent timing signals of switches S3I, S3O and S3X, respectively. In this example, the signals for switches S3I, S3O and S3X are on for a gain of four, and off otherwise.

Figure 8:
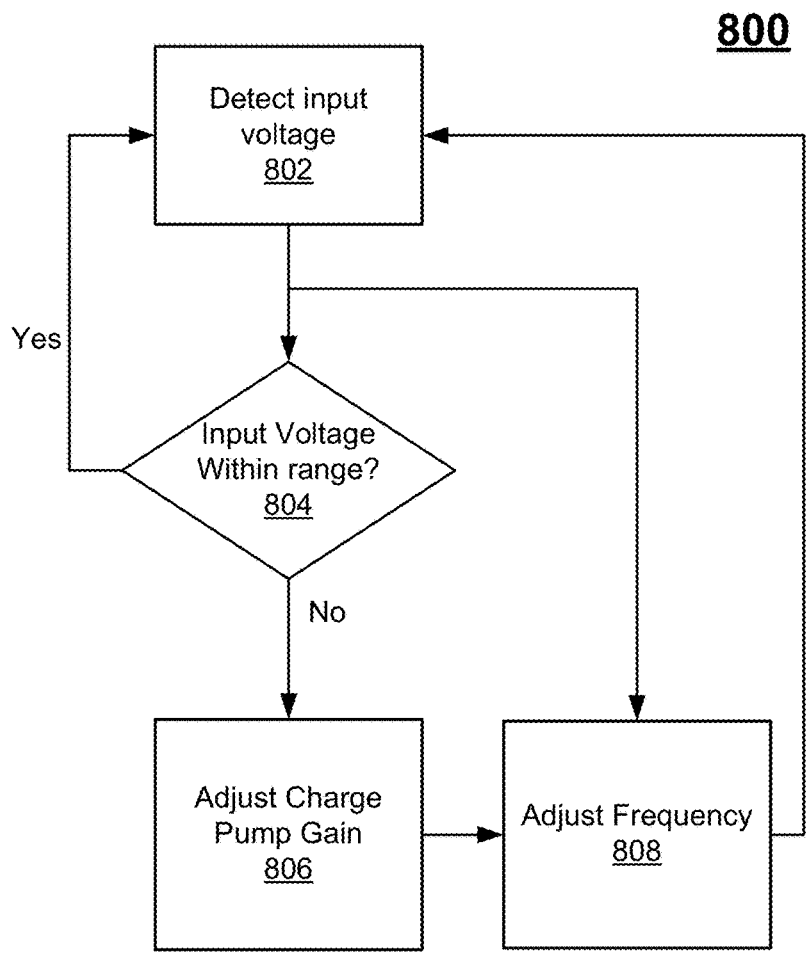
FIG. 8 illustrates a simplified diagram of a process flow of controlling a charge pump system according to an embodiment.

FIG. 8 illustrates a simplified diagram of a process flow 800 of controlling charge pump system 100 according to an embodiment. At 802, the input voltage V(IN) is detected to control a gain, a frequency, and output voltage V(OUT) of charge pump 102. At 804, charge pump system 100 determines whether the input voltage V(IN) is within a range. If the input voltage V(IN) is within a range at 804, the process loops back at 802, and the input voltage V(IN) is detected. Otherwise, if the input voltage V(IN) is not within the range at 804, then at 806, gain control circuit 104 changes the gain of charge pump 102 to maintain the output voltage V(OUT) of charge pump 102 in the voltage range, and loops back at 802 to detect the input voltage V(IN). At 808, voltage to frequency converter 106 continuously monitors the detected input voltage V(IN) and changes a frequency of a control signal applied to charge pump 102 based on changes in the detected input voltage V(IN) to maintain the frequency in a frequency range so that the output voltage V(OUT) of charge pump 102 is maintained in a voltage range, such as an approximately constant output voltage.

The switches described herein can be implemented as one or more transistors.

The charge pump systems disclosed herein use lower power, are simpler, and can be used between nodes of regulators.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A circuit comprising:
 a charge pump;
 a gain control circuit configured to detect an input voltage and generate a gain control signal to change a gain of the charge pump to maintain an output voltage of the charge pump in a voltage range, wherein the gain control circuit is an analog-to-digital converter that is configured to generate a digital signal to control selection of switches in the charge pump for controlling selection of capacitors in the charge pump based on the input voltage; and
 a voltage to frequency converter configured to detect a first voltage and change a frequency of a frequency control signal applied to the charge pump based in the detected first voltage to maintain the frequency in a frequency range so that the output voltage of the charge pump is maintained in the voltage range.

2. The circuit of claim 1 wherein the charge pump includes a plurality of capacitors that couple charge between an input of the charge pump and an output of the charge pump, wherein the gain control signal configures the number of capacitors that couple the charge, wherein the gain control circuit is further configured to change the gain of the charge pump by reducing a number of capacitors that couple charge based on an increase of the frequency of the frequency control signal.

3. The circuit of claim 1 wherein the gain control circuit is further configured to change the gain of the charge pump by changing a number of capacitors of the charge pump that couple charge between an input of the charge pump and an output of the charge pump.

4. The circuit of claim 1 wherein the voltage to frequency converter is a voltage controlled oscillator configured to generate clock signals as the frequency control signal in response to the changes in the detected first voltage.

5. The circuit of claim 1 further comprising a current detector configured to detect a first current, wherein the voltage to frequency converter is further configured to provide the first voltage based on the first current to change the frequency of the frequency control signal based on the detected first current.

6. The circuit of claim 1 further comprising:
 a current source coupled to an input of the charge pump;
 a current sink coupled between the current source and ground; and
 a current detector configured to detect current from the current source,
 wherein the voltage to frequency converter is further configured to provide the first voltage based on a detected current to change the frequency of the frequency control signal based on the detected current to cause input current to the charge pump to be approximately equal to the current from the current source.

7. The circuit of claim 1 wherein the first voltage is the input voltage.

8. A circuit comprising:
 a charge pump including an input for receiving an input voltage and having an output for providing an output voltage based on the input voltage, the charge pump having a selectable gain in response to a gain control signal and a gain in response to a frequency control signal;

a gain control circuit configured to detect the input voltage and generate the gain control signal to select the gain of the charge pump to maintain the output voltage of the charge pump in a voltage range; and a frequency control circuit configured to detect a first voltage and generate the frequency control signal to maintain a frequency in a frequency range so that the output voltage of the charge pump is maintained in the voltage range, wherein the frequency control circuit is a voltage controlled oscillator configured to generate clock signals as the frequency control signal in response to the changes in the detected first voltage.

9. The circuit of claim 8 wherein the charge pump includes a plurality of capacitors that couple charge between the input of the charge pump and the output of the charge pump, wherein the gain control signal configures the number of capacitors that couple the charge, wherein the gain control circuit is further configured to change the gain of the charge pump by reducing a number of capacitors that couple charge based on an increase of the frequency of the frequency control signal.

10. The circuit of claim 8 wherein the gain control circuit is further configured to change the gain of the charge pump by changing a number of capacitors of the charge pump that couple charge between the input of the charge pump and the output of the charge pump.

11. The circuit of claim 8 wherein the gain control circuit is an analog-to-digital converter that is configured to generate a digital signal to control selection of switches in the charge pump for controlling selection of capacitors in the charge pump based on the input voltage.

12. The circuit of claim 8 further comprising a current detector configured to detect a first current, wherein the frequency control circuit is further configured to provide the first voltage based on the first current to change the frequency of the frequency control signal based on the detected first current.

13. The circuit of claim 8 further comprising:
a current source coupled to the input of the charge pump;
a current sink coupled between the current source and ground; and
a current detector configured to detect current from the current source,
wherein the frequency control circuit is further configured to provide the first voltage based on a detected current to change the frequency of the frequency control signal based on the detected current to cause input current to the charge pump to be approximately equal to the current from the current source.

14. A method comprising:
detecting an input voltage to control a gain and an output voltage of a charge pump;
changing the gain of the charge pump to maintain the output voltage of the charge pump in a voltage range;
detecting a first current;
generating a first voltage based on the first current; and
changing a frequency of a control signal applied to the charge pump based on the first voltage to maintain the frequency in a frequency range so that the output voltage of the charge pump is maintained in the voltage range.

15. The method of claim 14 wherein changing the gain of the charge pump includes reducing a number of capacitors that couple charge between an input of the charge pump and an output of the charge pump based on an increase of the frequency of the control signal.

16. The method of claim 14 wherein changing the gain of the charge pump includes changing a number of capacitors that couple charge between an input of the charge pump and an output of the charge pump.

17. The method of claim 14 further comprising:
sourcing a current to an input of the charge pump from a current source;
sinking a current from the current source to ground;
detecting current from the current source; and
changing the frequency of the control signal based on the detected current to cause input current to the charge pump to be approximately equal to the current from the current source.

18. A circuit comprising:
a charge pump;
a gain control circuit configured to detect an input voltage and generate a gain control signal to change a gain of the charge pump to maintain an output voltage of the charge pump in a voltage range; and
a voltage to frequency converter configured to detect a first voltage and change a frequency of a frequency control signal applied to the charge pump based in the detected first voltage to maintain the frequency in a frequency range so that the output voltage of the charge pump is maintained in the voltage range;
a first circuit having a first terminal coupled to the input voltage and a second terminal, the first circuit providing current to the second terminal from the first terminal, and wherein the second terminal is coupled to an input of the charge pump;
a regulator to regulate a voltage on the second terminal;
a current sense circuit to sense the current from the first circuit and provide a second voltage; and
a comparator to receive the second voltage and a reference voltage and produce the detected first voltage.

* * * * *